United States Patent
Duthie et al.

(10) Patent No.: US 11,788,387 B2
(45) Date of Patent: Oct. 17, 2023

(54) WELLBORE TUBULAR WITH LOCAL INNER DIAMETER VARIATION

(71) Applicant: Halliburton Energy Services, Inc., Houston, TX (US)

(72) Inventors: Angus Duthie, Magnolia, TX (US); Mikko K. Jaaskelainen, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 106 days.

(21) Appl. No.: 17/237,781

(22) Filed: Apr. 22, 2021

(65) Prior Publication Data

US 2022/0341319 A1    Oct. 27, 2022

(51) Int. Cl.
*E21B 43/10*   (2006.01)
*G01F 1/661*   (2022.01)
*G01B 11/16*   (2006.01)
*G01K 11/32*   (2021.01)
*G01H 9/00*    (2006.01)

(52) U.S. Cl.
CPC ............ *E21B 43/103* (2013.01); *G01F 1/661* (2013.01); *G01B 11/16* (2013.01); *G01H 9/004* (2013.01); *G01K 11/32* (2013.01)

(58) Field of Classification Search
CPC .............................. E21B 43/103; G01F 1/661
See application file for complete search history.

(56) References Cited

U.S. PATENT DOCUMENTS

| | | | | |
|---|---|---|---|---|
| 4,757,709 A | * | 7/1988 | Czernichow | G01F 1/363 73/861.65 |
| 7,165,892 B2 | * | 1/2007 | Grigsby | E21B 17/028 346/33 A |
| 9,551,201 B2 | * | 1/2017 | Ring | E21B 43/105 |
| 9,828,849 B2 | | 11/2017 | Godfrey et al. | |
| 10,287,854 B2 | | 5/2019 | Jaaskelainen et al. | |
| 10,337,316 B2 | * | 7/2019 | Jaaskelainen | E21B 47/135 |
| 2016/0265345 A1 | * | 9/2016 | In 'T Panhuis | E21B 47/107 |

OTHER PUBLICATIONS

Canada Intellectual Property Office, Office Action, CA 3,117,926, dated Aug. 10, 2022, 3 pages.
Renegade, "Local Expander Annular Squeeze Tool", https://renegadewls.com/wireline-services/completions/local-expander/, available at least as early as Mar. 26, 2021, 8 pages.

* cited by examiner

*Primary Examiner* — Jonathan Malikasim
(74) *Attorney, Agent, or Firm* — Kilpatrick Townsend & Stockton LLP

(57) ABSTRACT

A wellbore system includes a wellbore tubular with local inner diameter variation. The system includes a wellbore tubular that is positionable in a wellbore for producing hydrocarbon fluid. The wellbore tubular includes at least one portion of an inner wall with a greater inner diameter than other portions of the inner wall of the wellbore tubular. The system includes a fiber optic cable of a fiber optic sensing system that is positionable in the wellbore for measuring flow disturbance of production fluid at the at least one portion of the inner wall to monitor hydrocarbon production flow.

20 Claims, 6 Drawing Sheets

WELLBORE TUBULAR WITH LOCAL INNER DIAMETER VARIATION

TECHNICAL FIELD

The present disclosure relates generally to wellbore completion operations and, more particularly (although not necessarily exclusively), to monitoring flow in a wellbore.

BACKGROUND

The hydrocarbon extraction industry makes use of wellbore drilling to explore and recover natural resources such as water, oil, and gas. After a wellbore is drilled, completion operations are performed on the wellbore to allow hydrocarbons to flow out of the formation and up to the surface. Completion operations can include, among other things, casing, cementing, and perforating the wellbore.

DETAILED DESCRIPTION

Figure 1:
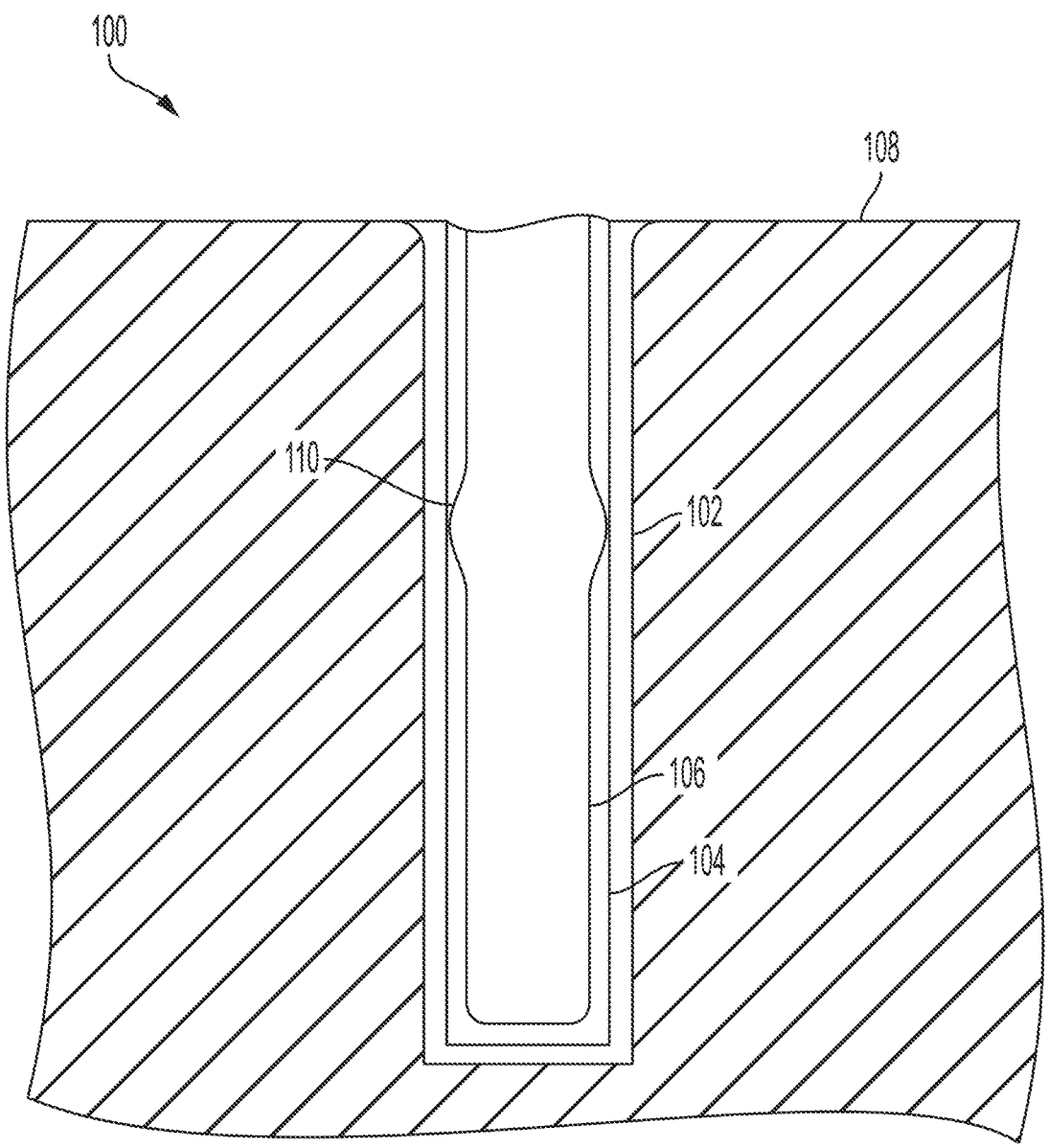
FIG. 1 is a schematic of a system for expanding a portion of a wellbore tubular according to one example of the present disclosure.

Certain aspects and examples of the present disclosure relate to a wellbore tubular that includes an inner diameter with an expanded portion for improved flow monitoring in a wellbore. Examples of a wellbore tubular can include a casing or tubing positioned within a wellbore during a completion operation. The expanded portion can be a portion of the wellbore tubular that has an inner diameter that is greater than the inner diameter of at least another portion of the wellbore tubular. In some examples, the wellbore tubular can include multiple expanded portions. The changes in the inner diameter along the wellbore tubular can cause reflections of pressure pulses that can be used to monitor fluid flow in the wellbore.

Production flow monitoring in wells may be challenging for a number of reasons. For example, no two reservoirs or wells in a reservoir or are the same. Porosity, permeability, pore throat sizes, chemical composition, layers, faults, depths, temperatures, pressures, etc. depend on how the reservoir was formed over time and each factor can vary with location. Reservoirs also deplete over time, which can result in changes in pressure, flow rates, gas-oil-water ratios, solution gas, gas-oil interfaces, and oil-water interfaces. Additionally, flow regimes can change as the fluid composition changes over time or distance along the wellbore. The flow regime can also change along the wellbore as the flow rate is different between the toe of the well and the heel of the well. Production flow monitoring may also be challenging because drilling is often not done in a perfectly straight line since natural undulations occur during the drilling process. Directional drilling may additionally be used to target particular spots in reservoir layers, or different reservoir layers within the same well, making it difficult to replicate in-situ conditions.

The process to drill, complete, and produce hydrocarbons from a well starts with drilling a wellbore into the subsurface. A wellbore tubular, such as a casing, can then be lowered into the wellbore, and sensors may be attached to the outside of the wellbore tubular as the wellbore tubular is lowered into the wellbore. The sensors may be electrical or optical single point or multi-point sensors, or distributed fiber optic sensors in various cable configurations. The cables and sensors may be clamped to the wellbore tubular and protected against mechanical damage with centralizers during run-in-hole. The annular space between the wellbore and wellbore tubular can then be cemented once the wellbore tubular string has been landed at depth. Unconventional wells can be perforated and hydraulically fractured using plug-and-perf type operations before a well is put on production. Other wells may be single or dual trip completions with various completion designs including flow control valves on tubing, slotted liners, perforated liners, gravel packs, packers, etc.

Aspects of the present disclosure use distributed fiber optic sensors (DFOS), distributed acoustic sensors (DAS), distributed temperature sensors (DTS), distributed strain sensors (DSS), or multi-point pressure sensors to measure variations in signal properties across a flow disturbance created by the variation in the inner diameter of the wellbore tubular. The variation may be created by running an expansion tool within the wellbore tubular to generate areas of larger inner diameter relative to the wellbore tubular. The depth location can be monitored used DAS, and the location of the expansion tool can be controlled using this information.

The local inner diameter variation of the wellbore tubular can be done before or after the wellbore tubular has been run to the desired depth and before the completion has been cemented in place. An advantage of running the expansion tool and increasing the inner diameter before running the wellbore tubular to depth can include that no cables or sensors will be connected to the wellbore tubular at that time. An advantage of running the expansion tool and increasing the inner diameter before cementing is that any cables or sensors located behind the casing can move freely as the wellbore tubular is expanded. Portions of the inner diameter of the wellbore tubular may be expanded after the completion has been cemented or after the well has been hydraulically treated. A challenge with expanding the inner diameter after the cement is set is that the process may damage any sensors located in the cemented annular space. The process to modify a tubing section inside a cased hole can be done at any time given that the tubing is free to expand inside the casing whereas casing sections may be constrained by cement in the annular space.

There may be advantages associated with increasing the wellbore tubular inner diameter instead of decreasing it. For example, increasing the inner diameter may not restrict flow or reduce production pressure and may not limit any future well maintenance or completions activities. Additionally, increasing the inner diameter may not add any equipment to the wellbore and may not involve surface equipment for activating downhole devices.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic of a system 100 for expanding a portion of a wellbore tubular 104 according to one example of the present disclosure. During a completion operation, the wellbore tubular 104, which may be a casing or a tubing, can be positioned within a wellbore 102. The wellbore 102 can be formed below a surface 108 in a subterranean formation. Prior to positioning the wellbore tubular 104 within the wellbore 102, the wellbore tubular 104 can have a same inner diameter along the entire length of the wellbore tubular 104. Once the wellbore tubular 104 is positioned at a desired length within the wellbore 102, an expansion tool 106 can be deployed downhole within the wellbore tubular 104. The expansion tool 106 can include one or more expanded portions 110 that can enlarge portions of the wellbore tubular 104. The expansion tool 106 can cause at least one portion of an inner wall of the wellbore tubular 104 to have an inner diameter greater than other portions of the inner wall of the wellbore tubular 104. As one particular example, the Local Expander™, available from Renegade Services of Woodward, Okla., is an annular squeeze tool that is an example of the expansion tool 106.

In some examples, the expansion tool 106 may alternatively be run in the wellbore tubular 104 to create the portions of greater inner diameter prior to the wellbore tubular 104 being run into the wellbore 102. Expanding the wellbore tubular 104 before deploying the wellbore tubular 104 in the wellbore 102 can eliminate running a wireline into the wellbore 102. Additionally, no cables or sensors will be connected to the wellbore tubular 104 at this time, which can reduce a possibility of damaging the cables or sensors.

If the wellbore tubular 104 is expanded while positioned within the wellbore 102, the expansion may be performed prior to or subsequent to a cementing operation or a fracturing operation. Performing the expansion at any of these times would involve a wireline run within the wellbore 102. Running the expansion tool 106 into the wellbore tubular 104 prior to a cementing operation may reduce a possibility of crushing any cables. However, there may be a potential for erosion or weak-point creation at the portions of the inner wall of the wellbore tubular 104 with the greater inner diameter prior to and subsequent to the cementing operation and prior to the fracturing operation. Using the expansion tool 106 subsequent to the cementing operation and prior to the fracturing operation may introduce a potential to pump down after a toe of the wellbore 102 is prepped.

In some examples, the wellbore tubular 104 may be pre-fabricated to include the portions of the inner wall with the greater inner diameter. Thus, the expansion tool 106 may not be run within the wellbore tubular 104. This can eliminate a tool run and associated time for on-site operations.

Figure 2:
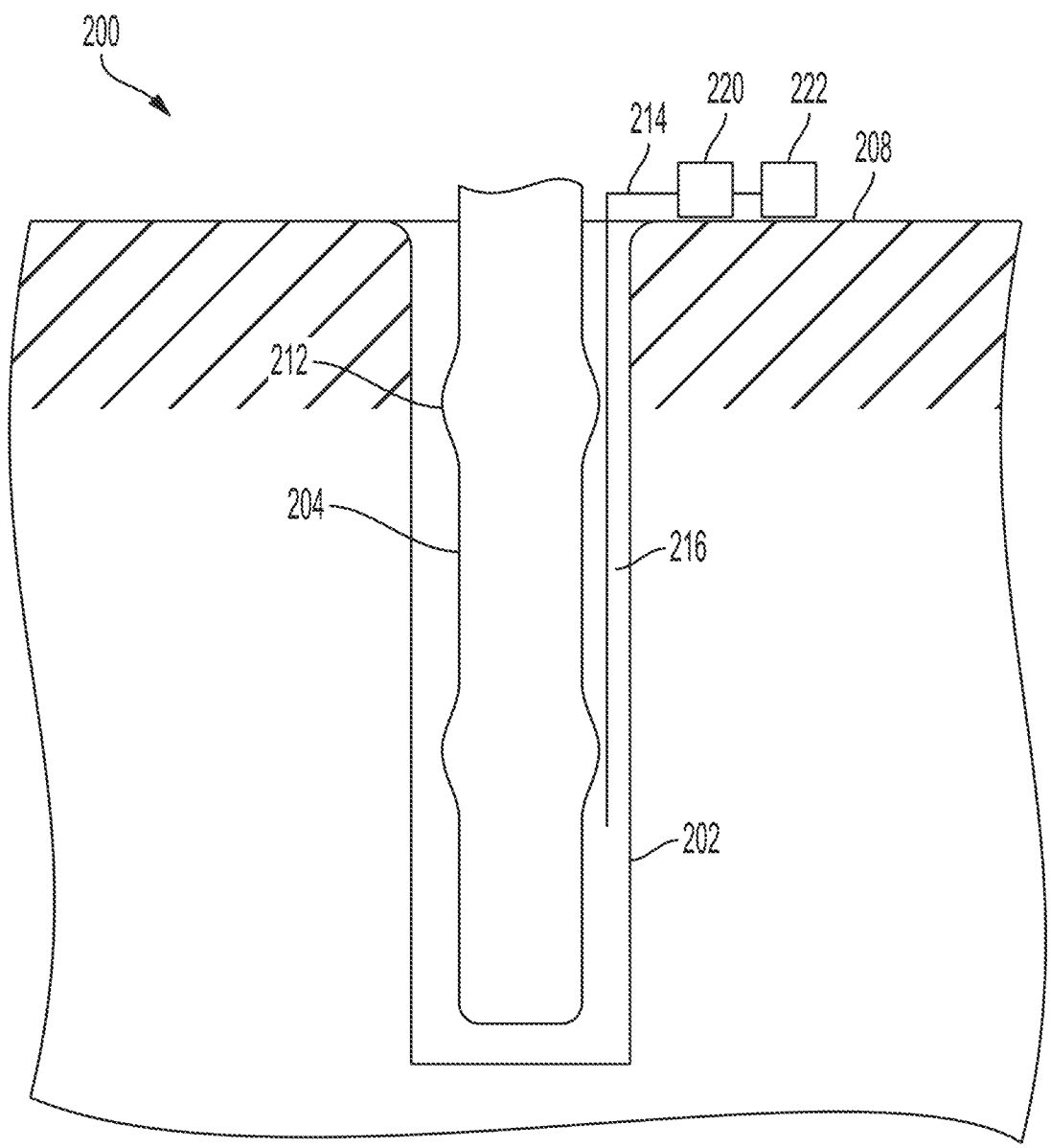
FIG. 2 is a schematic of a system for monitoring a wellbore with a partially expanded wellbore tubular according to one example of the present disclosure.

FIG. 2 is a schematic of a system 200 for monitoring a wellbore 202 with a partially expanded wellbore tubular 204 according to one example of the present disclosure. An inner wall of the wellbore tubular 204 can include portions 212 with a greater inner diameter than other portions of the inner wall of the wellbore tubular 204. The portions 212 may be pre-fabricated or may have been created by an expansion tool, such as the expansion tool 106 in FIG. 1.

The system 200 can additionally include a fiber optic cable 214 that is deployed downhole in the wellbore 202 and that is in communication with a sensing system 220. The fiber optic cable 214 and the sensing system 220 together may be referred to as a fiber optic sensing system. The fiber optic cable 214 may house one or several optical fibers and the optical fibers may be single mode fibers, multi-mode fibers or a combination of single mode and multi-mode optical fibers. The portions 212 can cause measurable pressure pulse reflections that are detectable by the fiber optic cable 214, so the fiber optic cable 214 can measure flow disturbance of production fluid at the portions 212 of the inner wall to monitor hydrocarbon production flow.

The fiber optic cable 214 is illustrated as a permanently installed sensor that is cemented in place in an annular space 216 between the wellbore tubular 204 and formation. The fiber optic cable 214 may be clamped to the outside of the wellbore tubular 204 during the deployment, and protected by centralizers and cross coupling clamps during Run-In-Hole (RIH) before being cemented in place. Electrical or fiber optic cables used for single point, multi-point, or distributed sensing may be deployed outside the wellbore tubular 204. Pressure sensors may be deployed in mandrels where pressure may be ported to measure pressure inside the wellbore tubular 204 or outside the wellbore tubular 204. Other types of sensors may also be deployed outside the wellbore tubular 204.

Other examples include tubing conveyed cables or retrievable sensing cables like wireline and slickline inside the wellbore tubular 204, or cables deployed inside coiled tubing, where the coiled tubing can be temporarily deployed inside the wellbore tubular 204. Low flow rate wells may generate weak signals, and the coiled tubing may be inserted into the wellbore tubular 204 to reduce the flow area and thereby increase the flow rate in the wellbore 202 with associated increase in acoustic, temperature, or pressure signals at or near the flow disturbance, such that it is possible to compute or determine a flow rate. The wellbore tubular 204 inserted into the wellbore 202 may be a coiled tubing tubular, and the coiled tubing may house a distributed fiber optic sensing system.

Fiber optic cables may also be deployed in wells using gravity where a weight or conveyance vehicle is dropped into a wellbore and fiber is released in the well as the deployment vehicle moves down the wellbore tubular 204. In some instances, a gravity based deployment vehicle may be released into the wellbore 204 and then optionally pumped into a horizontal portion of the wellbore 202.

Other types of fiber optic sensors may include point sensors either at the surface 208 or downhole using permanent cables or retrievable cables. Single point or multi-point pressure or temperature sensors may be used in reservoir monitoring applications, where the pressure sensors may be capable of collecting data at rates up to 2,000 Hz or even higher.

The sensing system 220 connected to the fiber optic cable 214 may include Distributed Temperature Sensing (DTS) systems, Distributed Acoustic Sensing (DAS) Systems, Distributed Strain Sensing (DSS) Systems, quasi-distributed sensing systems where multiple single point sensors are distributed along an optical fiber or the fiber optic cable 214, or single point sensing systems where the sensors are located at the end of the fiber optic cable 214. The sensing system 220 can compute a flow rate along the well using measured values of one or more signals across the flow disturbance, one or more signals along the wellbore, one or more signals at inflow points (e.g., perforated zones in a plug-and-perf completion), or one or more surface measurements.

The sensing system 220 may operate using various sensing principles including Rayleigh scattering, Brillouin scattering, and Raman scattering. The sensing system 220 may include, but is not limited to, amplitude based sensing systems, like DTS systems based on Raman scattering or phase sensing based systems like DAS systems based on interferometric sensing using homodyne or heterodyne techniques, where the sensing system 220 may sense phase or intensity changes due to constructive or destructive interference. The sensing system 220 may additionally include strain sensing systems, such as DSS, using dynamic strain measurements based on interferometric sensors or static strain sensing measurements using Brillouin scattering. A DSS system can use quasi-distributed sensors based on Fiber Bragg Gratings (FBGs), where a wavelength shift is detected, or multiple FBGs are used to form Fabry-Perot type interferometric sensors for phase or intensity-based sensing. Single point fiber optic sensors based on Fabry-Perot or FBG or intensity-based sensors may additionally be used.

DAS systems may be based on optical time domain based interferometry where optical pulses from two points along the fiber are combined to create the interferometric signals. Any acoustic, thermal, or mechanical disturbances acting on the optical fiber between the optical pulses can cause a phase shift in the interferometric signal, and the DAS system can detect this phase shift. The distance between the two optical pulses may be referred to as the optical path length difference, the optical gauge length, or the spatial resolution in some cases. The distance between the two optical pulses, or the sensing fiber length between the two optical pulses, is directly related to, or in general proportional to, the signal strength detected by the DAS system. The optical pulse width, amplitude, and spacing between the two pulses can influence the detected signal strength. Many of the subsurface events to be detected with DAS systems are point events, where it may be desirable to have a short gauge length to be able to accurately determine depth and spatially differentiate between two closely spaced events.

DAS systems with a single fixed gauge length can be used for various applications, and DAS systems may be preconfigured with a specific gauge length for a specific application. DAS systems with a single fixed gauge length may be at a disadvantage for applications where it may be desirable to have a system with a user selectable gauge length. U.S. Pat. No. 10,337,316 "Distributed acoustic sensing system with variable spatial resolution" involves a system design with multiple gauge lengths that may be used with aspects of the present disclosure.

True Distributed Fiber Optic Sensing (DFOS) systems may operate based on Optical Time Domain Reflectometry (OTDR) principles or Optical Frequency Domain Reflectometry (OFDR). OTDR based systems can be pulsed, where one or more optical pulses may be transmitted down an optical fiber of the fiber optic cable 214 and backscattered light (e.g., Rayleigh, Brillouin, Raman etc.) can be measured and processed. Time of flight for the optical pulse(s) can indicate where along the optical fiber the measurement is done. OFDR based systems operate in continuous wave (CW) mode where a tunable laser is swept across a wavelength range, and the back scattered light can be collected and processed.

Various hybrid approaches using single point, quasi-distributed, or distributed fiber optic sensors mixed with electrical sensors may also be used. The fiber optic cable 214 may then include an optical fiber and electrical conductors. Electrical sensors may be pressure sensors based on quarts-type sensors, strain gauge based sensors, or other suitable sensing technologies. Pressure sensors, optical sensors, or electrical sensors may be housed in dedicated gauge mandrels or attached outside the wellbore tubular 204 in various configurations for downhole deployment or deployed conventionally at the surface wellhead or flow lines.

The sensing system 220 can also be in communication with a computing device 222 for monitoring production flow of the wellbore 202 using measurements from the sensing system 220. For example, temperature measurements from a DTS system may be used to determine locations for water injection applications where fluid inflows in a treatment well, since the fluids from the surface 208 are likely to be cooler than formation temperatures. Additionally, DTS may be used for warm-back analyses to determine fluid volume placement. This may be done for water injection wells and the same technique can be used for fracturing fluid placement. Temperature measurements in observation wells can be used to determine fluid communication between the treatment well and observation well, or to determine formation fluid movement.

In some examples, DAS data can be used by the computing device 222 to determine fluid allocation in real-time as acoustic noise is generated by high rate turbulent fluid flowing through the wellbore tubular 204 and through perforations into the formation. Phase and intensity based interferometric sensing systems are sensitive to temperature and mechanical induced vibrations, as well as acoustically induced vibrations. DAS data can be converted from time-series data to frequency-domain data using Fast Fourier Transforms (FFT). Other transforms, such as wavelet transforms, may also be used to generate different representations of the data. Various frequency ranges can be used for different purposes. For example, low frequency signal changes may be attributed to formation strain changes or temperature changes due to fluid movement, and other frequency ranges may be indicative of fluid or gas movement. Various filtering techniques and models may be applied to generate indicators of events that may be of interest. Indicators may include formation movement due to growing natural fractures, formation stress changes during the fracturing operations, fluid seepage during the fracturing operation as formation movement may force fluid into an observation well, fluid flow from fractures, and fluid and proppant flow from fracturing hits. Each indicator may have a characteristic signature in terms of frequency content, amplitude, or time-dependent behavior. These indicators may also be present at other data types and not limited to DAS data. Fiber optic cables used with DAS systems may include enhanced back scatter optical fibers, where the Rayleigh backscatter may be increased by 10× or more with associated increase in Optical Signal to Noise Ratio (OSNR). Enhanced sensing fibers may have distributed perturbations or periodic perturbations where perturbations in the optical fiber may be spatially co-located with variations of the wellbore tubular 204 inner diameter.

DAS systems can also be used to detect various seismic events where stress fields or growing fracture networks generate microseimic events or where perforation charge events may be used to determine travel time between horizontal wells. This information can be used from stage to stage to determine changes in travel time as the formation is fractured and filled with fluid and proppant. The DAS systems may also be used with surface seismic sources to generate Vertical Seismic Profiles (VSPs) before, during, and after a fracturing operation to determine the effectiveness of the fracturing operation, as well as to determine production effectiveness. VSPs and reflection seismic surveys may be used over the life of a well or reservoir to track production related depletion or to track water, gas, or polymer flood fronts.

DSS data can be generated using various approaches and static strain data can be used to determine absolute strain changes over time. Static strain data can be measured using Brillouin based systems or quasi-distributed strain data from FBG based system. Static strain may also be used by the computing device 222 to determine propped fracture volume by looking at deviations in strain data from a measured strain baseline before fracturing a stage. It may also be possible to determine formation properties, such as permeability, poroelastic responses, and leak off rates based on the change of strain versus time and the rate at which the strain changes over time. Dynamic strain data can be used in real-time to detect fracture growth through an appropriate inversion model, and appropriate actions can be taken to mitigate detrimental effects. For example, dynamic changes to fluid flow rates in the treatment well, addition of diverters or chemicals into the fracturing fluid, or changes to proppant concentrations or types can be implemented.

Fiber Bragg Grating based systems may also be used for a number of different measurements. FBG's are partial reflectors that can be used as temperature and strain sensors, or can be used to make various interferometric sensors with very high sensitivity. FBG's can be used to make point sensors or quasi-distributed sensors. FBG based sensors can be used independently or with other types of fiber optic based sensors. FBG's can manufactured into an optical fiber at a specific wavelength, and other system like DAS, DSS or DTS systems may operate at different wavelengths in the same fiber and measure different parameters simultaneously as the FBG based systems using Wavelength Division Multiplexing (WDM) or Time Division Multiplexing (TDM).

In some examples, the sensors can be placed in either a treatment well or a monitoring well to measure well communication. The treatment well pressure, rate, proppant concentration, diverters, fluids, and chemicals may be altered to change the hydraulic fracturing treatment. These changes may impact the formation responses in several different ways. For example, stress fields may change, which may generate microseismic effects that can be measured with DAS systems and/or single point seismic sensors like geophones. Additionally, fracture growth rates may change, which can generate changes in measured microseismic events and event distributions over time. The fracture growth rates may also generate changes in measured strain using the low frequency portion or the DAS signal or Brillouin based sensing systems. Pressure changes may occur due to poroelastic effects and may be measured in the monitoring well. Pressure data may additionally be measured in the treatment well and correlated to formation responses. Also, various changes in treatment rates and pressure may generate events that can be correlated to fracture growth rates.

Several measurements can be combined to determine adjacent well communication, and this information can be used to change the hydraulic fracturing treatment schedule to generate desired outcomes. Multiple wells in a field or reservoir may be instrumented with optical fibers for monitoring subsurface reservoirs from creation to abandonment. Subsurface applications may include hydrocarbon extraction, geothermal energy production, or fluid injection.

The measured data can be used to derive relationships from a flow model between the design parameters, inflow conditions, surface and subsurface measures, and production output using machine learning (ML) or artificial intelligence (AI) algorithms. To develop a robust and reliable flow model, ML and AI algorithms capable of handling complex behavior can be used. To achieve this, supervised and unsupervised ML and AI algorithms can be employed. The flow model can be developed either using supervised or unsupervised ML or AI algorithms.

Given that the amount of data collected through DAS and DTS surface and subsurface sensors will be significant, unsupervised learning, such as principal component analysis (PCA) and independent component analysis (ICA), can be used. The unsupervised learning can reduce the dimensions to components that explain a high percentage of variance in the data. Furthermore, a clustering technique, such as density-based spatial clustering of applications with noise (DBSCAN), Gaussian Mixture, K-means, etc. can be used to cluster all possible conditions into a subset of clusters with homogenous behavior. The data in each cluster can then be used to develop a flow model specific for that cluster. Moreover, examining the distance between clusters and variables driving those distances can be used as a control measure to move from a cluster with an undesired production profile to clusters with more desirable production profiles.

Autoencoder deep learning models (e.g., long short-term memory (LSTM), recurrent neural networks (RNN), deep neural network (DNN) autoencoders, etc.) can be used as more complex techniques to reduce dimensionality. Furthermore, the developed autoencoder can be used to detect anomalies while monitoring the well. In the supervised learning, some parameters of production output can be used as the target while the design parameters, surface measures, and subsurface measures can be the predictors. The production output can either be univariate with a single output parameter or multivariate with multiple outputs, such as oil, gas, and water production. The supervised learning can include employing time-series ML and AI algorithms, such as RNN and LSTM, or can be built on different aggregated level techniques using non-time-series ML and AI algorithms, such as DNN, Randomforest, gradient boosting, etc. Furthermore, having such a rich dataset can allow models that can predict both surface output and contribution of each production interval to be built. The developed supervised or unsupervised models can then be used as a generator of flow profiles under different conditions. Furthermore, the models can be used to estimate conditions with optimal or desired outcome by means of reverse optimization.

Figure 3:
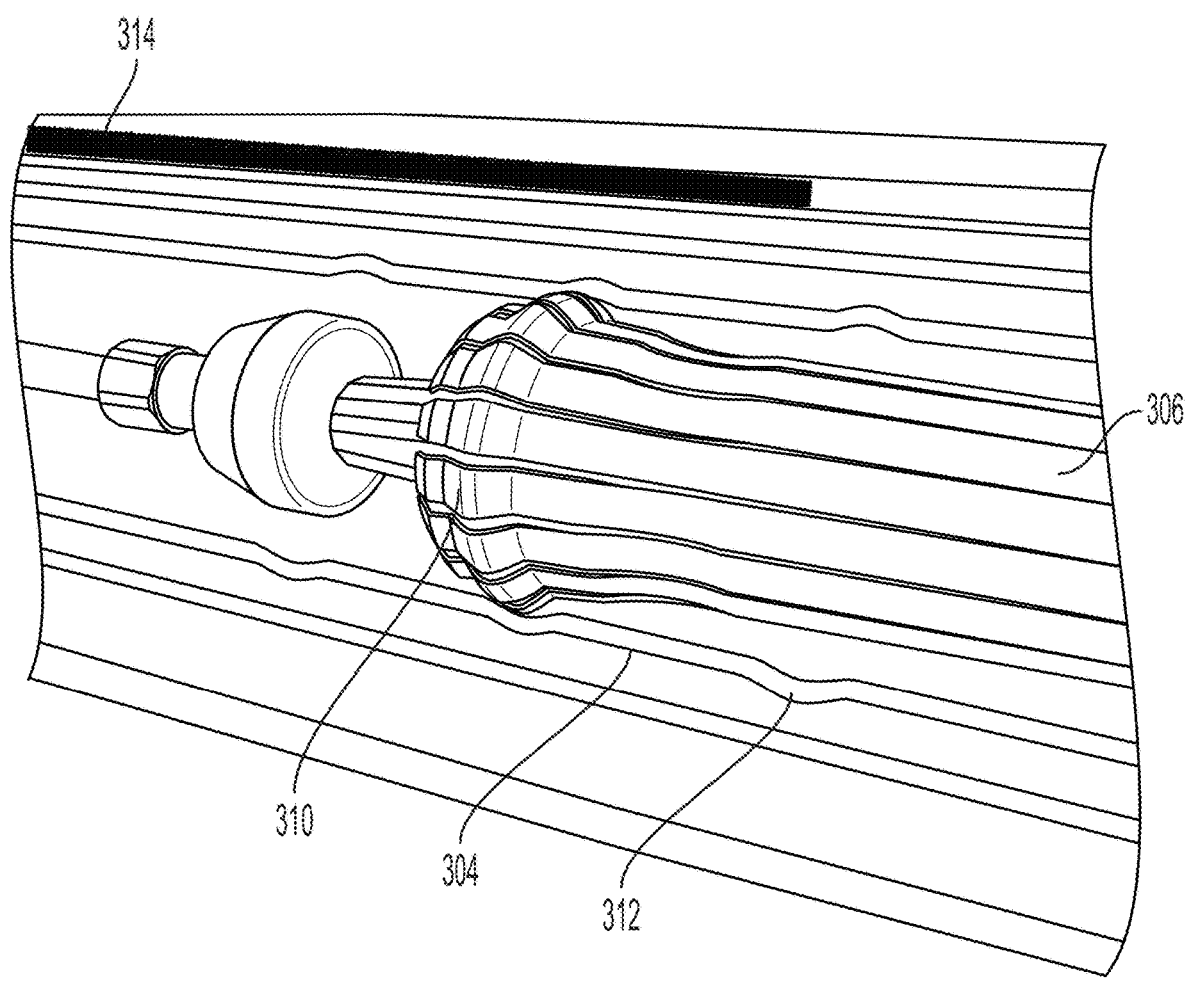
FIG. 3 is a schematic of a partially expanded wellbore tubular according to one example of the present disclosure.

FIG. 3 is a schematic of an expansion tool 306 and a partially expanded wellbore tubular 304 according to one example of the present disclosure. The wellbore tubular 304 can be positioned within a wellbore for producing hydrocarbon fluid. Subsequent to the wellbore tubular 304 being deployed in the wellbore, the expansion tool 306 can be deployed within the wellbore tubular 304. The expansion tool 306 can include an expanded portion 310 that has a diameter greater than other portions of the expansion tool 306. The expanded portion 310 can cause portions 312 of the inner wall of the wellbore tubular 304 to have a greater inner diameter than other portions. The portions 312 can be created at any number of desired positions along the wellbore tubular 304. The number of portions 312 may be varied along the wellbore, where areas closer to the toe of the well may have a higher count of the portions 312 where lower flow rates may be expected. The depth and shape of the portions 312 may also be varied by having a tool with multiple expanded portions 310.

A fiber optic cable 314 is also deployed in the wellbore. The fiber optic cable 314 can measure flow disturbance of production fluid at the portions 312. The fiber optic cable 314 can communicate the flow disturbance to a sensing system and a computing device for monitoring hydrocarbon production flow in the wellbore.

Figure 4:
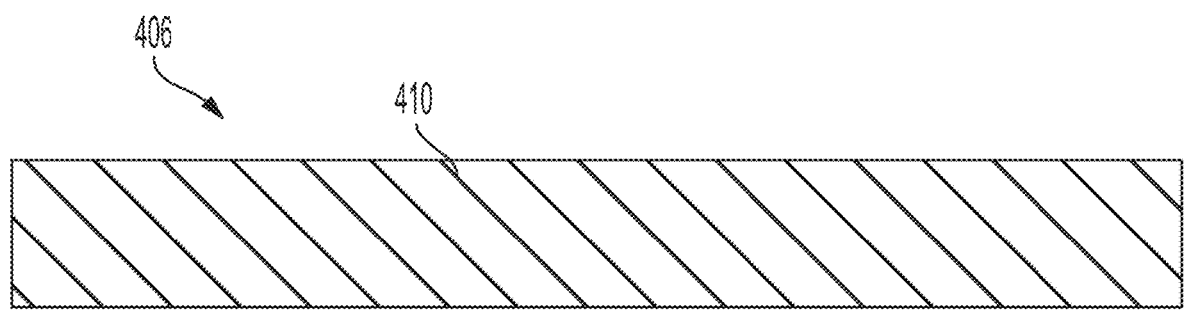
FIG. 4 is a schematic of an example of an expanding tool according to one example of the present disclosure.

FIG. 4 is a schematic of an example of an expansion tool 406 according to one example of the present disclosure. The expansion tool 406 may be designed to create inner diameter variations with different shapes or alignment of features when compared with the wellbore tubular direction. For example, the expansion tool 406 can include an expanded portion 410 at forty-five degrees relative to the axis of the wellbore to mix production fluids and turbulence that can be tracked using a sensing system (e.g., the sensing system 220 in FIG. 2). The expansion tool 406 may include an expanded portion 410 at any suitable angle. The angle may additionally vary along the length of the expansion tool 406, such that fluid momentum can be built up within the wellbore tubular. This may be particularly useful in oil-water scenarios, since it can be challenging to differentiate between two liquids with similar properties in laminar conditions.

It may be desirable to introduce multiple inner diameter variations over a length of the wellbore tubular that is equal to or larger than the expected sensing system gauge length for increased signal capture. The expansion tool 406 can include expanded portions 410 to create the multiple inner diameter variations over the length of the wellbore tubular. A number of locations may have similar inner diameter variations such that signals can be compared between different locations along the wellbore to allocate flow. It may also be desirable to have different lengths of inner diameter variations along the length of the wellbore as fluid flow velocities along the wellbore generally increase from the toe to the heel of the well. A higher flow rate may generate a higher signal that can may be detected over a shorter length of inner diameter variation.

Figure 5:
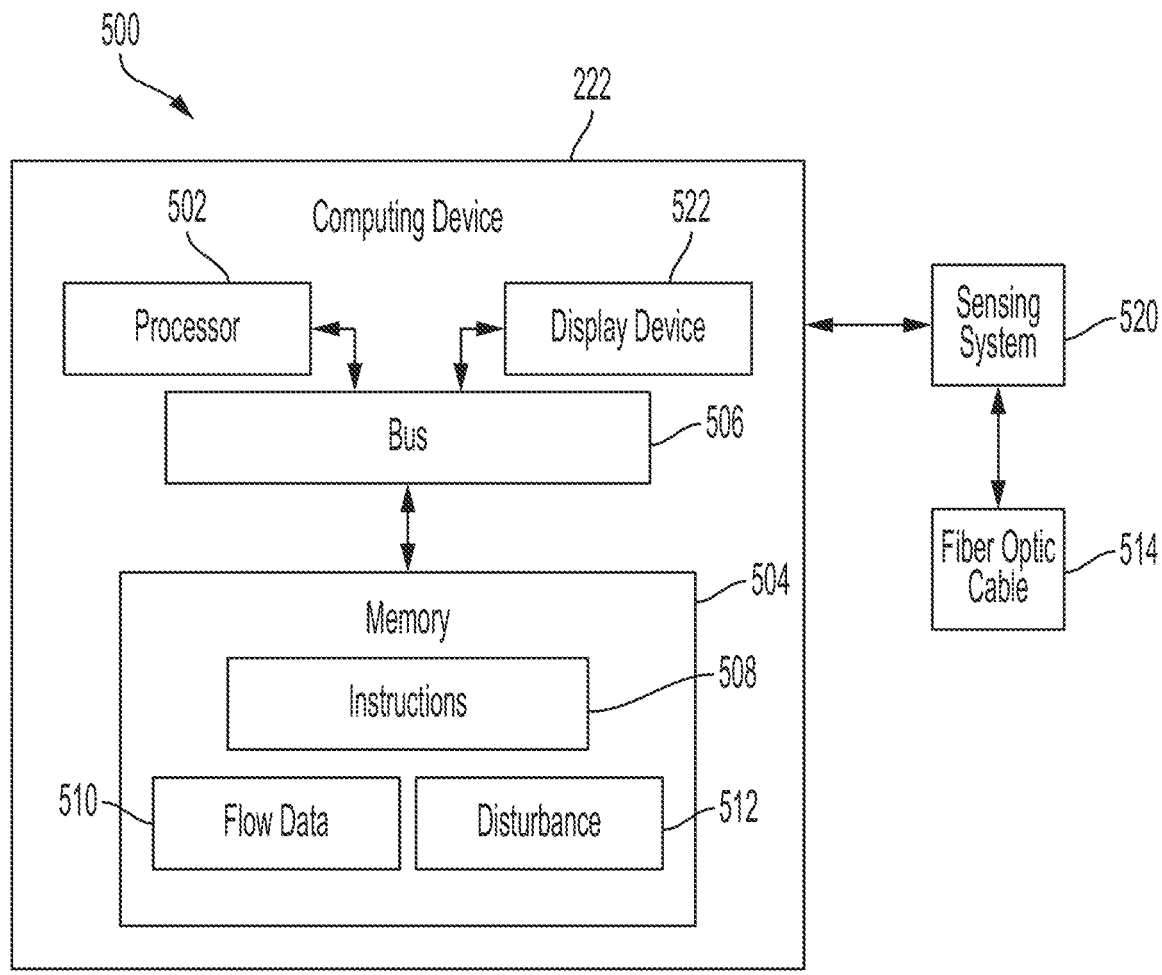
FIG. 5 is a block diagram of an example of a computing system for monitoring flow in a wellbore according to one example of the present disclosure.

FIG. 5 is a block diagram of an example of a computing system 500 for monitoring flow in a wellbore according to one example of the present disclosure. The computing system 500 can include a computing device 222. The computing device 222 can include a processor 502 interfaced with other hardware via a bus 506. A memory 504, which can include any suitable tangible (and non-transitory) computer-readable medium, such as random-access memory ("RAM"), read-only memory ("ROM"), electrically erasable and programmable read-only memory ("EEPROM"), or the like, can embody program components that configure operation of the computing device 222. In some examples, the computing device 222 can be communicatively connected to input/output interface components (e.g., a printer, keyboard, touch-sensitive surface, and mouse) and additional storage. The computing device 222 can include a display device 522. The computing device 222 can be communicatively connected to a communications device which can include an antenna.

The processor 502 can be communicatively coupled to the memory 504 308 via the bus 506. The non-volatile memory device may include any type of memory device that retains stored information when powered off. Non-limiting examples of the memory device 308 include EEPROM, flash memory, or any other type of non-volatile memory. In some examples, at least part of the memory 504 can include a medium from which the processor 502 can read instructions. A computer-readable medium can include electronic, optical, magnetic, or other storage devices capable of providing the processor 502 with computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

In some examples, the memory 504 can include instructions 508 for monitoring flow in a wellbore. The computing device 222 can be connected to a sensing system 520, which can be an example of the sensing system 220 in FIG. 2. The sensing system 520 can be in communication with a fiber optic cable 514 that provides flow data 510 about the wellbore to the computing device 222. The sensing system 520 and the fiber optic cable 514 can be a fiber optic sensing system.

The wellbore can include a wellbore tubular positioned within it. The wellbore tubular can have at least one portion of the inner wall that has a greater diameter than other portions. The greater-diameter portions can be pre-fabricated or created by an expansion tool during a wellbore operation.

In some examples, flow signatures of the flow data 510 may be different between perforated areas, sections of the wellbore tubular with the smaller inner diameter, and the portions of the wellbore tubular with the greater inner diameter. The computing device 222 can use various data driven approaches to process the collected flow data 510 to generate flow models that can be used for automatic flow monitoring. For example, changes in the inner diameter of the inner wall of the wellbore tubular may cause reflections of pressure pulses that can then also be used to measure Doppler shift for bulk flow if the reflections can be tracked using the fiber optic cable 514 or the sensing system. Multi-point downhole pressure sensing using pressure gauges and slimline arrays can then be used for monitoring bulk flow. Acoustic intensity or frequency in the flow data 510 can also be correlated into a flow rate that can be allocated along the wellbore. The flow data 510 may additionally be used to determine a disturbance 512 in the flow. The computing device 222 can determine a flow rate from the determined disturbance 512. The computing device 222 can use the determined flow rate to adjust subsequent completion operations. The subsequent completion operations may be adjusted based on the flow rate to ensure new wells are more prolific.

Figure 6:
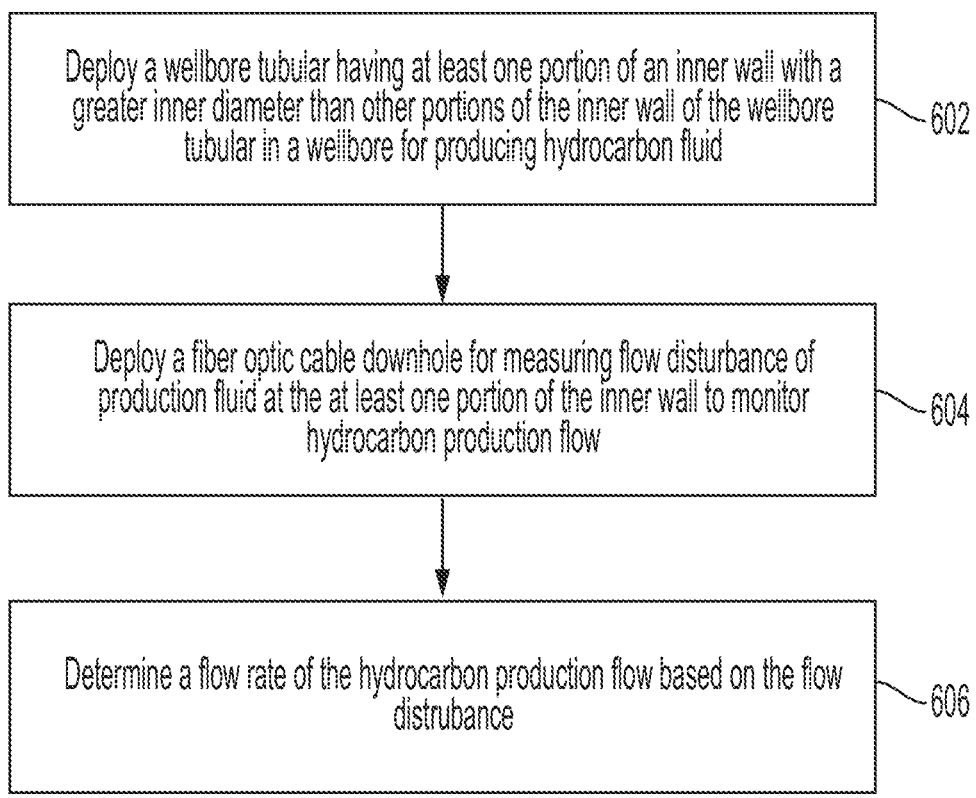
FIG. 6 is a flowchart of an example of a process for deploying a wellbore tubular and monitoring fluid flow in a wellbore according to one example of the present disclosure.

FIG. 6 is a flowchart of an example of a process for deploying a wellbore tubular and monitoring fluid flow in a wellbore according to one example of the present disclosure. In block 602, a wellbore tubular having at least one portion of an inner wall with a greater inner diameter than other portions of the inner wall of the wellbore tubular can be deployed in a wellbore for producing hydrocarbon fluid. The at least one portion of the inner wall with the greater inner diameter may be pre-fabricated in the wellbore tubular or may be created by an expansion tool prior to the wellbore tubular being deployed in the wellbore. The at least one portion of the inner wall with the greater inner diameter may alternatively be created by the expansion tool subsequent to the wellbore tubular being deployed in the wellbore and prior to a cementing operation, subsequent to the cementing operation and prior to a fracturing operation, or subsequent to the fracturing operation. A fiber optic cable may be clamped to the outside of the wellbore tubular during the deployment process.

In block 604, a fiber optic cable of a fiber optic sensing system can be deployed downhole for measuring flow disturbance of production fluid at the at least one portion of the inner wall to monitor hydrocarbon production flow. The fiber optic cable may be a retrievable fiber optic sensing system deployed using wireline, slickline, coiled tubing, gravity deployed fibers or pumped fibers or cables. The fiber optic cable may house one or multiple pressure sensors along the length of the cable. The at least one portion of the inner wall of the wellbore tubular can cause measurable pressure pulse reflections from a pressure pulse that are detectable by the fiber optic sensing system.

A pressure pulse may be tracked along the fiber optic cable using a sensing system or the pressure pulse may be measured as a pressure variation as it propagates past one or more pressure sensors. The sensing system may be a DAS system that can measure variations in signals, where the intensity at one or more frequencies at or near the flow disturbance may differ from the acoustic intensities at one or more frequencies before or after the flow disturbance. The DAS system may also measure signals along the wellbore and at inflow points, like perforated intervals. The DAS system may measure data with different gauge lengths, where point events like inflow points may be measured and characterized with a shorter gauge length, distributed events like flow along the wellbore can be measured with a longer gauge length, and measurements at a flow disturbance can be measured with a gauge length adjusted to the length of the flow disturbance. The sensing system may alternatively be a DTS system that can measure absolute temperature and temperature variations along the wellbore or a DSS system that can measure absolute strain and strain variations along the wellbore.

In block 606, a flow rate of the hydrocarbon production fluid along the wellbore can be determined based on the flow disturbance. The flow disturbance can cause acoustic, temperature, strain, or pressure signal variations that can be measured by the fiber optic sensing system. Pressure pulses may be generated at the surface by a pressure transducer, changing surface choke settings, or shutting down the well and pressure pulses or reflections can be tracked and used to determine the flow rate and to allocate flow along the wellbore. The computed flow rate may be used to adjust future wellbore operations to optimize well and reservoir production.

In some aspects, a system, a method, and an apparatus for fluid flow monitoring are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a system comprising a wellbore tubular positionable in a wellbore for producing hydrocarbon fluid, the wellbore tubular having at least one portion of an inner wall with a greater inner diameter than other portions of the inner wall of the wellbore tubular, and a fiber optic cable of a fiber optic sensing system positionable in the wellbore for measuring flow disturbance of production fluid at the at least one portion of the inner wall to monitor hydrocarbon production flow.

Example 2 is the system of example 1, further comprising an expansion tool positionable in the wellbore tubular to create the greater inner diameter of the at least one portion of the inner wall.

Example 3 is the system of example 2, wherein a portion of the expansion tool comprises the greater inner diameter to create the greater inner diameter of the at least one portion of the inner wall.

Example 4 is the system of examples 1-3, wherein the fiber optic sensing system is configured to determine a flow rate of the production fluid based on a signal across the flow disturbance, a signal along the wellbore, or a signal at an inflow point.

Example 5 is the system of example 4, wherein the fiber optic sensing system is further configured to determine a variation in the signal across the flow disturbance and determine the flow rate based on the variation in the signal.

Example 6 is the system of examples 1-5, wherein the wellbore tubular includes the greater inner diameter at multiple portions of the inner wall over a length of the wellbore tubular that is equal to or larger than a gauge length of the fiber optic sensing system.

Example 7 is the system of examples 1-6, wherein the greater inner diameter of the at least one portion of the inner wall is created subsequent to the wellbore tubular being positioned in the wellbore.

Example 8 is the system of examples 1-7, wherein the at least one portion of the inner wall with the greater inner diameter is configured to cause measurable pressure pulse reflections, temperature variations, acoustic variations, or strain variations that are detectable by the fiber optic sensing system.

Example 9 is a method comprising deploying a wellbore tubular having at least one portion of an inner wall with a greater inner diameter than other portions of the inner wall of the wellbore tubular in a wellbore for producing hydrocarbon fluid, deploying a fiber optic cable of a fiber optic sensing system downhole for measuring flow disturbance of production fluid at the at least one portion of the inner wall to monitor hydrocarbon production flow, and determining a flow rate of the hydrocarbon production flow based on the flow disturbance.

Example 10 is the method of example 9, further comprising deploying an expansion tool in the wellbore tubular to create the greater inner diameter of the at least one portion of the inner wall.

Example 11 is the method of example 10, wherein a portion of the expansion tool comprises the greater inner diameter to create the greater inner diameter of the at least one portion of the inner wall.

Example 12 is the method of examples 9-11, wherein determining the flow rate comprises determining a variation in a signal across the flow disturbance and determining the flow rate based on the variation in the signal.

Example 13 is the method of examples 9-12, wherein the wellbore tubular includes the greater inner diameter at multiple portions of the inner wall over a length of the wellbore tubular that is equal to or larger than a gauge length of the fiber optic sensing system.

Example 14 is the method of examples 9-13, wherein the at least one portion of the inner wall with the greater inner diameter is configured to cause measurable pressure pulse reflections, temperature variations, acoustic variations, or strain variations that are detectable by the fiber optic sensing system.

Example 15 is an apparatus comprising an expansion tool positionable within a wellbore tubular to create at least one portion of an inner wall of the wellbore tubular with a greater diameter than other portions of the inner wall of the wellbore tubular and a fiber optic cable of a fiber optic sensing system positionable in a wellbore for measuring flow disturbance of production fluid at the at least one portion of the inner wall to monitor hydrocarbon production flow.

Example 16 is the apparatus of example 15, wherein a portion of the expansion tool comprises the greater inner diameter to create the greater inner diameter of the at least one portion of the inner wall.

Example 17 is the apparatus of examples 15-16, wherein the fiber optic sensing system is configured to determine a flow rate of the production fluid based on a signal across the flow disturbance, a signal along the wellbore, or a signal at an inflow point.

Example 18 is the apparatus of example 17, wherein the fiber optic sensing system is further configured to determine a variation in the signal across the flow disturbance and determine the flow rate based on the variation in the signal.

Example 19 is the apparatus of examples 15-18, wherein the wellbore tubular includes the greater inner diameter at multiple portions of the inner wall over a length of the wellbore tubular that is equal to or larger than a gauge length of the fiber optic sensing system.

Example 20 is the apparatus of examples 15-19, wherein the at least one portion of the inner wall with the greater inner diameter is configured to cause measurable pressure pulse reflections, temperature variations, acoustic variations, or strain variations that are detectable by the fiber optic sensing system.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a wellbore tubular positionable in a wellbore for producing hydrocarbon fluid, the wellbore tubular having at least one portion of an inner wall with a greater inner diameter than other portions of the inner wall of the wellbore tubular, a first angle of a first portion of the at least one portion relative to an axis of the wellbore being different than a second angle of a second portion of the at least one portion relative to the axis of the wellbore; and
a fiber optic cable of a fiber optic sensing system positionable in the wellbore for measuring an acoustic amplitude or an acoustic frequency of flow disturbance of production fluid at the at least one portion of the inner wall to monitor hydrocarbon production flow and to determine an adjustment for a wellbore completion operation.

2. The system of claim 1, further comprising:
an expansion tool positionable in the wellbore tubular to create the greater inner diameter of the at least one portion of the inner wall.

3. The system of claim 2, wherein a portion of the expansion tool comprises the greater inner diameter to create the greater inner diameter of the at least one portion of the inner wall.

4. The system of claim 1, wherein the fiber optic sensing system is configured to determine a flow rate of the production fluid based on a signal across the flow disturbance, a signal along the wellbore, or a signal at an inflow point.

5. The system of claim 4, wherein the fiber optic sensing system is further configured to:
determine a variation in the signal across the flow disturbance; and
determine the flow rate based on the variation in the signal.

6. The system of claim 1, wherein the wellbore tubular includes the greater inner diameter at multiple portions of the inner wall that are spaced from each other a along longitudinal length of the wellbore tubular that is equal to or larger than a gauge length of the fiber optic sensing system.

7. The system of claim 1, wherein the greater inner diameter of the at least one portion of the inner wall is created subsequent to the wellbore tubular being positioned in the wellbore.

8. The system of claim 1, wherein the at least one portion of the inner wall with the greater inner diameter is configured to cause measurable pressure pulse reflections, temperature variations, acoustic variations, or strain variations that are detectable by the fiber optic sensing system.

9. A method comprising:
deploying a wellbore tubular having at least one portion of an inner wall with a greater inner diameter than other portions of the inner wall of the wellbore tubular in a wellbore for producing hydrocarbon fluid, a first angle of a first portion of the at least one portion relative to an axis of the wellbore being different than a second angle of a second portion of the at least one portion relative to the axis of the wellbore;
deploying a fiber optic cable of a fiber optic sensing system downhole for measuring an acoustic amplitude or an acoustic frequency of flow disturbance of production fluid at the at least one portion of the inner wall to monitor hydrocarbon production flow;
determining a flow rate of the hydrocarbon production flow based on the flow disturbance; and
determining an adjustment for a wellbore completion operation based on the flow rate.

10. The method of claim 9, further comprising:
deploying an expansion tool in the wellbore tubular to create the greater inner diameter of the at least one portion of the inner wall.

11. The method of claim 10, wherein a portion of the expansion tool comprises the greater inner diameter to create the greater inner diameter of the at least one portion of the inner wall.

12. The method of claim 9, wherein determining the flow rate comprises:
determining a variation in a signal across the flow disturbance; and
determining the flow rate based on the variation in the signal.

13. The method of claim 9, wherein the wellbore tubular includes the greater inner diameter at multiple portions of the inner wall that are spaced from each other along a longitudinal length of the wellbore tubular that is equal to or larger than a gauge length of the fiber optic sensing system.

14. The method of claim 9, wherein the at least one portion of the inner wall with the greater inner diameter is configured to cause measurable pressure pulse reflections, temperature variations, acoustic variations, or strain variations that are detectable by the fiber optic sensing system.

15. An apparatus comprising:
an expansion tool positionable within a wellbore tubular to create at least one portion of an inner wall of the wellbore tubular with a greater inner diameter than other portions of the inner wall of the wellbore tubular, a first angle of a first portion of the at least one portion relative to an axis of the wellbore being different than a second angle of a second portion of the at least one portion relative to the axis of the wellbore; and a fiber optic cable of a fiber optic sensing system positionable in a wellbore for measuring an acoustic amplitude or an acoustic frequency of flow disturbance of production fluid at the at least one portion of the inner wall to monitor hydrocarbon production flow and to determine an adjustment for a wellbore completion operation.

16. The apparatus of claim 15, wherein a portion of the expansion tool comprises the greater inner diameter to create the greater inner diameter of the at least one portion of the inner wall.

17. The apparatus of claim 15, wherein the fiber optic sensing system is configured to determine a flow rate of the production fluid based on a signal across the flow disturbance, a signal along the wellbore, or a signal at an inflow point.

18. The apparatus of claim 17, wherein the fiber optic sensing system is further configured to:
   determine a variation in the signal across the flow disturbance; and
   determine the flow rate based on the variation in the signal.

19. The apparatus of claim 15, wherein the wellbore tubular includes the greater inner diameter at multiple portions of the inner wall that are spaced from each other along a longitudinal length of the wellbore tubular that is equal to or larger than a gauge length of the fiber optic sensing system.

20. The apparatus of claim 15, wherein the at least one portion of the inner wall with the greater inner diameter is configured to cause measurable pressure pulse reflections, temperature variations, acoustic variations, or strain variations that are detectable by the fiber optic sensing system.

* * * * *